United States Patent [19]
Nordberg

[11] Patent Number: 5,746,037
[45] Date of Patent: May 5, 1998

[54] CONCRETE BLOCK CONTAINING DISPOSABLE TIRE SECTIONS

[75] Inventor: Henry T. Nordberg, Oneida, N.Y.

[73] Assignee: Tirecore Limited Partnership, Tinton Falls, N.J.

[21] Appl. No.: 816,696

[22] Filed: Mar. 13, 1997

[51] Int. Cl.$^6$ .............. E04C 1/40; B29C 53/56
[52] U.S. Cl. .............. 52/405.1; 52/596; 52/604; 52/745.19; 52/DIG. 9; 242/525.3; 83/951; 29/401.1; 29/403.1; 264/DIG. 69; 264/138; 264/152; 264/271
[58] Field of Search .............. 52/DIG. 9, 745.19, 52/405.1–405.3, 596, 604; 242/160.4, 525.3, 528, 532.5, 532.6; 241/DIG. 31; 83/951; 29/401.1, 403.1; 264/DIG. 69, 138, 152, 275, 320

[56] References Cited

U.S. PATENT DOCUMENTS

| | | |
|---|---|---|
| 4,462,195 | 7/1984 | Nickerson .............. 52/405.1 |
| 5,013,509 | 5/1991 | Kiseelewski .............. 264/DIG. 69 X |
| 5,103,616 | 4/1992 | Nordberg . |
| 5,214,897 | 6/1993 | Nordberg . |
| 5,284,326 | 2/1994 | Chiovitti et al. .............. 29/403.1 X |
| 5,285,616 | 2/1994 | Tripp .............. 52/DIG. 9 X |
| 5,316,815 | 5/1994 | Tripp .............. 52/DIG. 9 X |
| 5,456,751 | 10/1995 | Zandi et al. . |
| 5,472,750 | 12/1995 | Miller . |
| 5,507,127 | 4/1996 | Gates . |

*Primary Examiner*—Robert Canfield
*Attorney, Agent, or Firm*—Wall Marjama & Bilinski

[57] ABSTRACT

A concrete building block or panel contains at least one tightly wound bundle of used tire casing tread sections that have been separated from the two end wall sections and which have been joined together and wound into a tight spiral bundle. In one form of the invention, the side wall sections are stacked in axial alignment and a tread bundle is inserted into the stack before being mounted in the block or panel.

34 Claims, 4 Drawing Sheets

CONCRETE BLOCK CONTAINING DISPOSABLE TIRE SECTIONS

BACKGROUND OF THE INVENTION

This application relates to disposing of used motor vehicle tire casings in an environmentally safe and useful manner.

As noted in U.S. Pat. Nos. 5,103,616 and 5,214,897 to Nordberg, disposal of used automobile and truck tires in becoming a major problem. Burying the tire casings in landfills is an unsatisfactory solution because the tire will not biodegrade. Open dump sites filled with old tires pose a constant fire hazard. To date, many incinerators will not accept tires for burning because the equipment is not able to handle this kind of waste. Nordberg, in the above noted patents, discloses a method of compacting a relatively large number of tire casings into a small bundle and encapsulating the bundle in a concrete block that can be used in constructing various types of useful structures such as retaining walls and the like.

In a later U.S. patent, U.S. Pat. No. 5,507,127, Gates discloses a concrete building block having an internal chamber that is filled with shredded tire casings. The casings are first shredded and then pressed and baled and the bale then enclosed in the center section of a three piece block. Because of the number of steps involved in the construction of the three-piece blocks, the unit cost of each block is relatively high.

Miller, in U.S. Pat. No. 5,472,750 describes an article that is fabricated from used tire casings. The tires are initially severed radially and a series of radial slits are cut in each side wall which extends inwardly to the tread section of the casing. The casing is then laid flat so that the tread section forms a central rib with the slit side wall extending outwardly to either side of the tread section in the form of a series of flap-like appendages. The flattened casings are then stacked one on top of the other to a desired height and bundled together using straps or elongated pins. The stacks, in turn, can be placed together in various configurations to create a desired structure.

Zandi et al. in U.S. Pat. No. 5,456,751 describes a concrete composition containing shredded tires in amounts of between 0.05 and 20% by weight. The shredded casing particles are ground to a fine particle size before they are added to the concrete mix. It is further suggested that fly ash be added to the mix as well as super plasticizers and sand. The tire casings must be preprocessed to remove metal reinforcing chords and any hydrophilic and hydrophobic contaminants that might be present which would weaken the final composition. As shown in the examples contained in the patent, the compressive strength of blocks formed of the mixture is relatively high. Here again, however, because of the number of processing steps involved, the cost of manufacturing structures is relatively high when compared to a conventional concrete block.

SUMMARY OF THE INVENTION

It is therefore a primary object of the present invention to provide an improved and more useful way to dispose of exhausted tire casings.

It is a further object of the present invention to provide a simple and inexpensive way to utilize spent automotive tire casings.

A still further object of the present invention is to provide a high density bundle made of used tire casings without having to shred or compact the tire casings.

Yet another object of the present invention is to provide building blocks containing used tire sections which have enhanced noise suppression and thermal insulation properties.

Another object of the present invention is to provide an environmentally safe means for disposing of spent tire casings.

These and other objects of the present invention are attained by separating the two side wall sections from the tread sections of used tire casings and slitting the tread sections so that they can be laid flat. The tread sections are joined end to end and rolled into a tight spiral bundle having any desired diameter. One or more bundles are placed in a preformed opening in a cement or concrete block, or alternatively, cast into the block to form a building structure having enhanced noise suppression and thermal insulation properties.

In one form of the invention, the end wall sections of the tire casings are stacked in axial alignment and a spiral wound bundle of tread sections is placed inside the stack to create a casing assembly that is then placed or cast into a concrete block.

BRIEF DESCRIPTION OF THE DRAWINGS

For a better understanding of these and other objects of the present invention, reference will be made to the following detailed description of the invention which is to be read in conjunction with the accompanying drawing.

DESCRIPTION OF THE INVENTION

Figure 1:
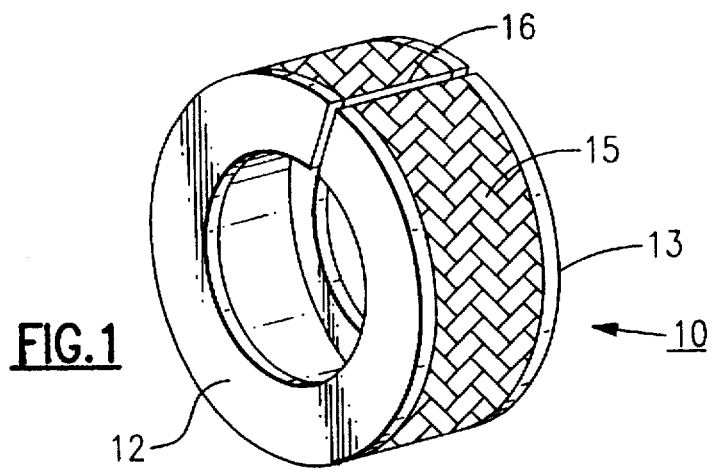
FIG. 1 is a perspective view of a used tire casing that has been cut radially so that the casing can be opened circumferentially to enable the tread section to be separated from the two end wall sections.

Referring initially to FIG. 1, there is shown a used tire casing generally referenced 10. The casing includes a pair of side wall sections 12 and 13 that are cojoined by a circumferential tread section 15. The tire casing has been cut radically through both side walls and the center tread section to provide a generous kerf 16. The casing can be peeled or rolled back at the kerf to permit further processing of the casing. In practice about one inch of tire material is removed from the casing at the kerf during the cutting operation, the reason for which will be explained in further detail below.

Figure 8:
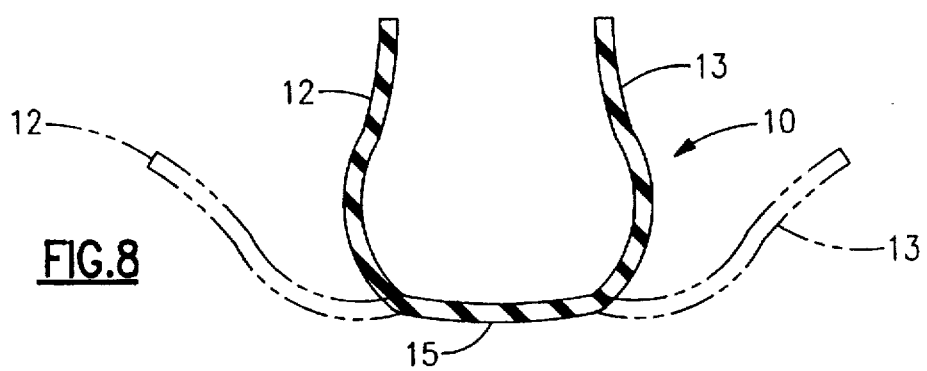
FIG. 8 is an enlarged section taken through a tire casing showing in phantom outline the side wall sections of the casing outwardly flexed.
Figure 9:
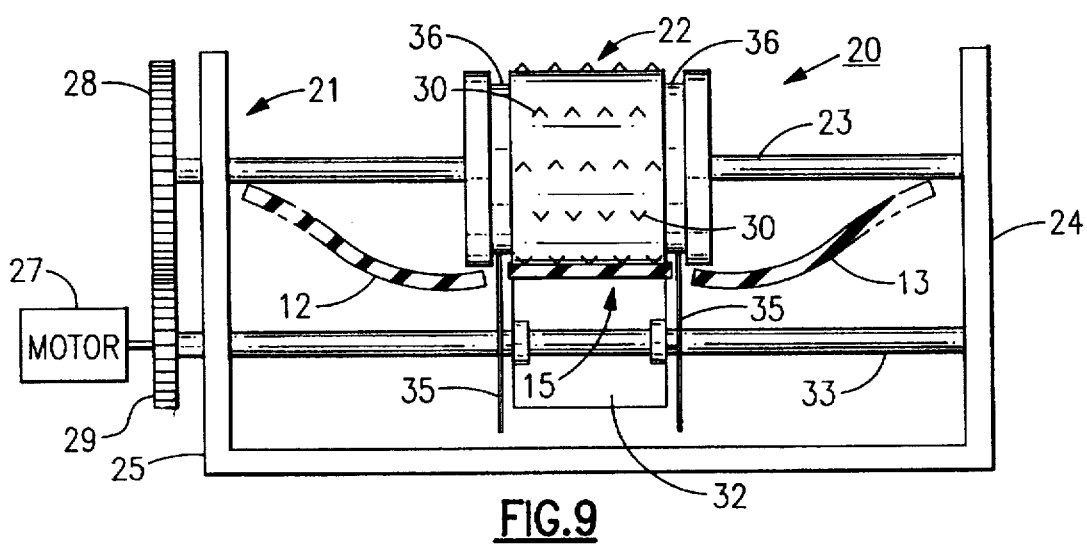
FIG. 9 is a schematic view of a machine used to separate the tread section of a tire casing from the two side wall sections.
Figure 10:
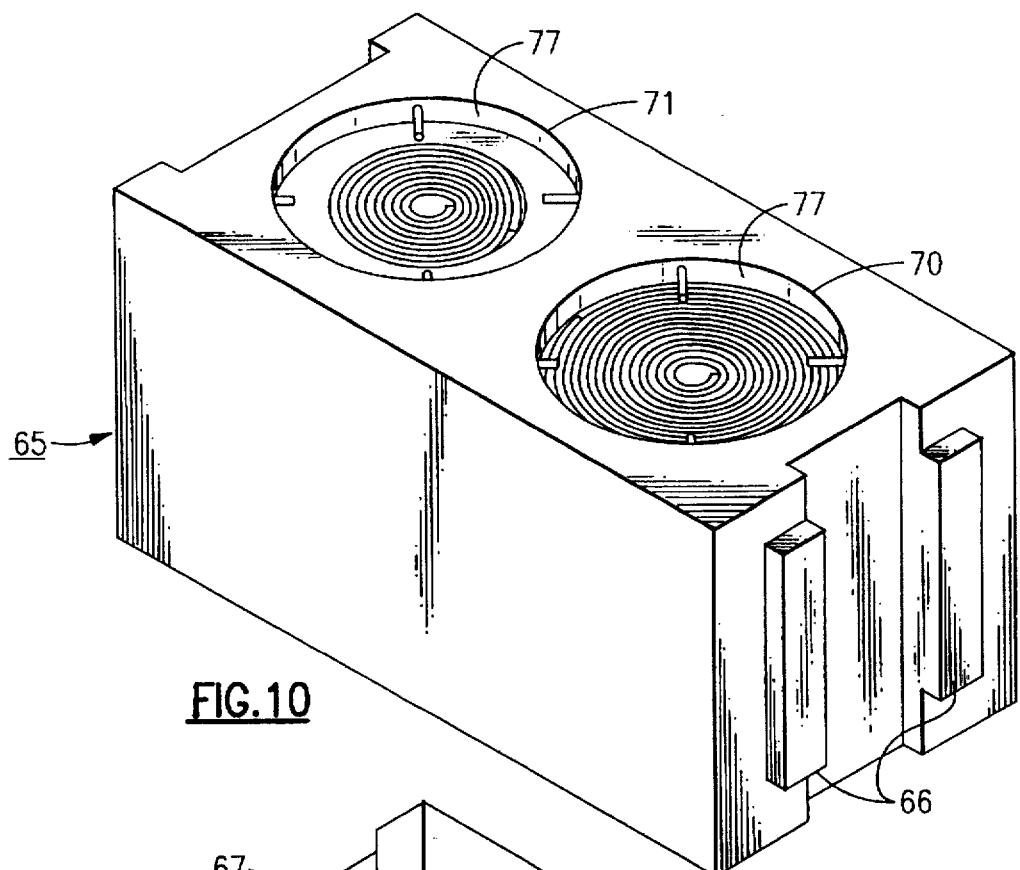
FIG. 10 is a top perspective view of a precast concrete block in which casing sections of used tires are contained in preformed blind openings cast in the block.
Figure 11:
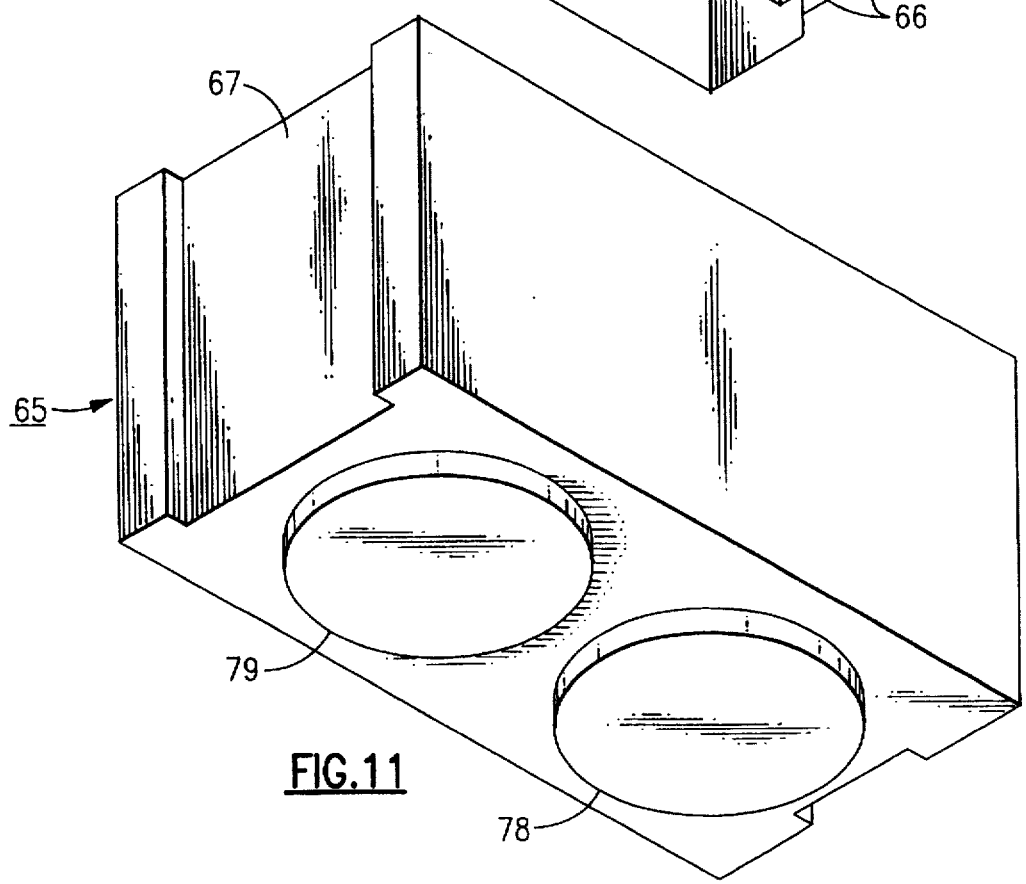
FIG. 11 is a bottom perspective view of the block shown in FIG. 10 showing the pads mounted upon the bottom wall of the block.

FIG. 8 depicts a tire casing section in the region just behind the kerf. The side walls of the casing in the region of the kerf are shown in phantom outline turned outwardly so that the casing can be loaded into a slitting machine 20, shown in FIG. 9. The machine is designed to separate the two-sided wall sections from the tread section. The machine contains a U-shaped frame 21 in which a drive roll 22 is mounted for rotation upon an upper shaft 23. The upper shaft is also journalled for rotation in the upraised arms 24 and 25 of the frame and is connected to a drive motor 27 by means of a pair of gears 28 and 29. The drive roll 22 is equipped with a series of studs 30—30 for gripping a casing that is brought into the nip between the drive roll and a pinch roll 32. The pinch roll is mounted upon lower shaft 33 which is journalled for rotation between the raised arms of the frame and is driven directly by the motor. A pair of slitter blades 35—35 are also mounted for rotation upon the lower shaft and are arranged to ride in circumferential grooves 36—36 formed in the drive roll.

In operation, the side walls of a casing are flexed outwardly as shown in FIG. 8 and the tread section of the casing is inserted between the drive roll and the pinch roll. The pinch roll is driven at a higher speed than the drive roll so that the blade operates to separate the tread section from the side wall sections as the casing moves through the rolls. It should be noted that any type of tire casing can be processed in the present apparatus without regard to whether the casing is belted with metal fibers or not.

Figure 2:
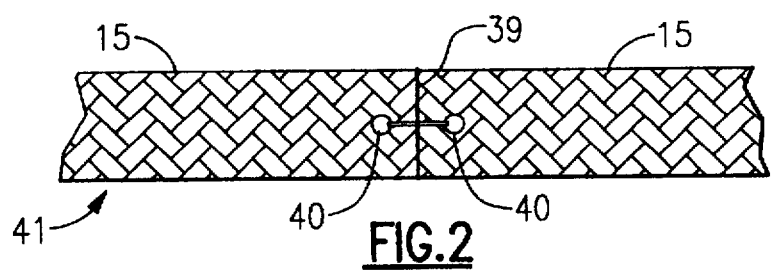
FIG. 2 is a partial top view showing two tread sections joined together in an end to end configuration to form a band of tread sections.
Figure 3:
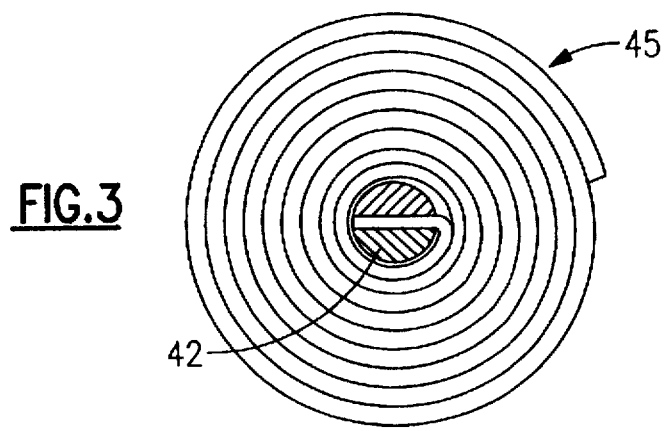
FIG. 3 is an end view showing an elongated band of tread sections tightly wound upon a split mandrel.

With further reference to FIGS. 2 and 3, the separated tread sections 15 are laid in abutting contact end to end and joined together by wire ties 39 that are passed through holes 40 formed in the adjacent sections. A number of tread sections are tied together to form an elongated band 41. One end of the band is placed in a split mandrel 42 of a winding machine and the band is spiral wound into a tight bundle 45 having a desired diameter.

Figure 7:
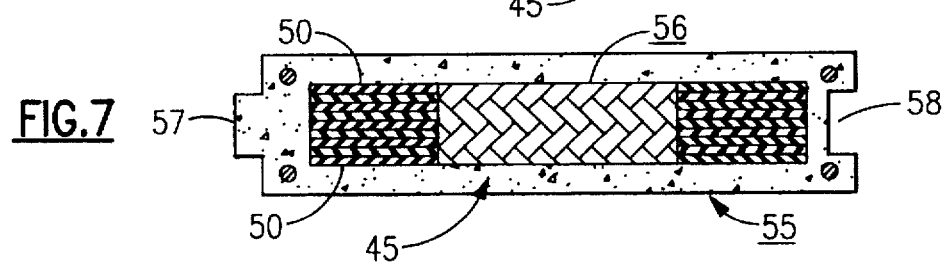
FIG. 7 is another sectional view showing a stack of axially aligned side wall casing sections containing a bundle of tread sections and the assembly completely encased in a concrete block.

The two side wall sections of the casing are placed one inside the other to form a side wall pair 50. As shown in FIG. 7, the pairs are stacked in axially alignment to a desired height and a tread section bundle 45 may be inserted into the center opening of the stack to create a compact casing assembly 52. In practice, the bundle is wound so that its diameter is slightly greater than the average hole size of the stacked side wall pairs. As a result, the bundle of tread sections is force fitted into the center of the stack and held tightly in place by deformed wall sections of the stack and any exposed metal reinforcing fibers that might be present, thus creating a tightly packed and bound assembly that can be easily handled without coming apart. It has been found that by cutting about a one inch radial kerf 16 (FIG. 1) in each casing, one side wall section of the casing can be compressed circumferentially so that it can be easily slipped inside the other side wall section of the casing to compact the side wall pairs and thus the entire stack assembly.

Figure 4:
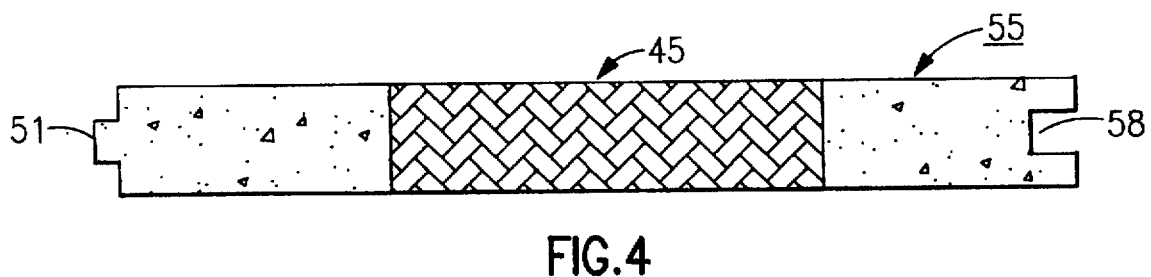
FIG. 4 is an enlarged view in section showing a bundle of spiral wound tread sections encased in a concrete block that has a thickness about equal to that of the bundle.

FIGS. 4-7 illustrate various cast concrete panel configurations that can be easily and inexpensively constructed utilizing both casing tread sections and side wall sections. As illustrated in FIG. 4, a tread bundle 45, is cast into a panel 55. The bundle in this embodiment has the same width as the panel. The panel is cast with a rib 57 central location and extending along the length of two adjacent peripheral walls thereof. A central groove 58 is centrally formed in the other two adjacent peripheral walls of the panel for receiving a rib of a second panel.

Accordingly, panels can be mounted in interlocking relationships to construct different structures such as sound barriers, retaining walls and the like.

Although only one tread bundle is shown in FIG. 4, it should be evident that a plurality of similar bundles can be cast into the panel to increase its sound deadening properties and where required, its thermal insulation properties.

Figure 5:
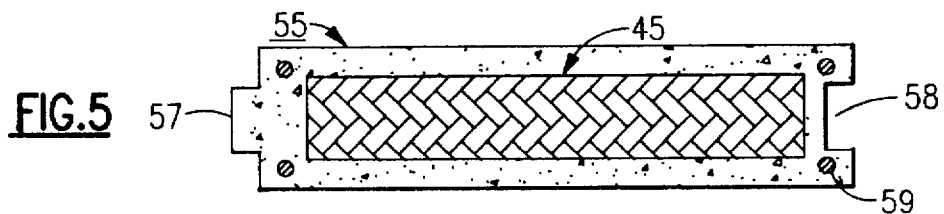
FIG. 5 is a further sectional view showing a spiral wound bundle completely encased in a concrete block.

FIG. 5 depicts a panel in which a tread section bundle 45 is completely encapsulated within a panel 55. The panel further contains reinforcing bars 59 to increase its strength. The bars can extend both vertically and horizontally within the panel. The opposing front and back walls of the panel can be textured or aesthetically finished to enhance the appearance of the panel. This type of panel is best suited for applications where the appearance of the panel is an important factor.

Figure 6:
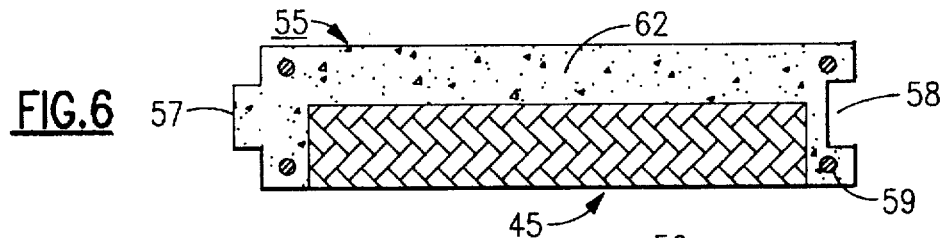
FIG. 6 is a still further sectional showing a spiral wound bundle partially encased in a concrete block.

FIG. 6 further illustrates a panel that also contains one or more tread bundles 45. The bundles can be easily cast into the panel 55 simply by placing the bundle upon the floor of a mold and casting the concrete about the exposed portions of the bundle. Here again the outer front wall 62 of the panel can be aesthetically finished to provide a pleasing appearance. This type of panel has particularly application in the construction of retaining walls wherein soil is filled against the open back wall of the panel or for use in patio blocks or the like where the open side of the block is placed against the earth or fill material.

FIG. 7, as noted above illustrates a panel containing a tire section assembly 52 that includes a stack of side wall sections in which is placed a tread bundle 45. Here again, the assembly is completely cast within a concrete panel 55. Alternatively, the tread bundle may be omitted from the assembly and the center of the stack or stacks filled with concrete.

Turning now to FIGS. 10-13 there is shown a further embodiment of the invention wherein tire casing sections are placed in specially prepared precast concrete blocks 65. Here again the one end wall of the block is provided with end wall ribs 66—66 that are arranged to mate with a recess 67 formed in the opposite end wall of an adjacent block. The block can thus be placed in end to end interlocking alignment when constructing walls and the like.

Figure 12:
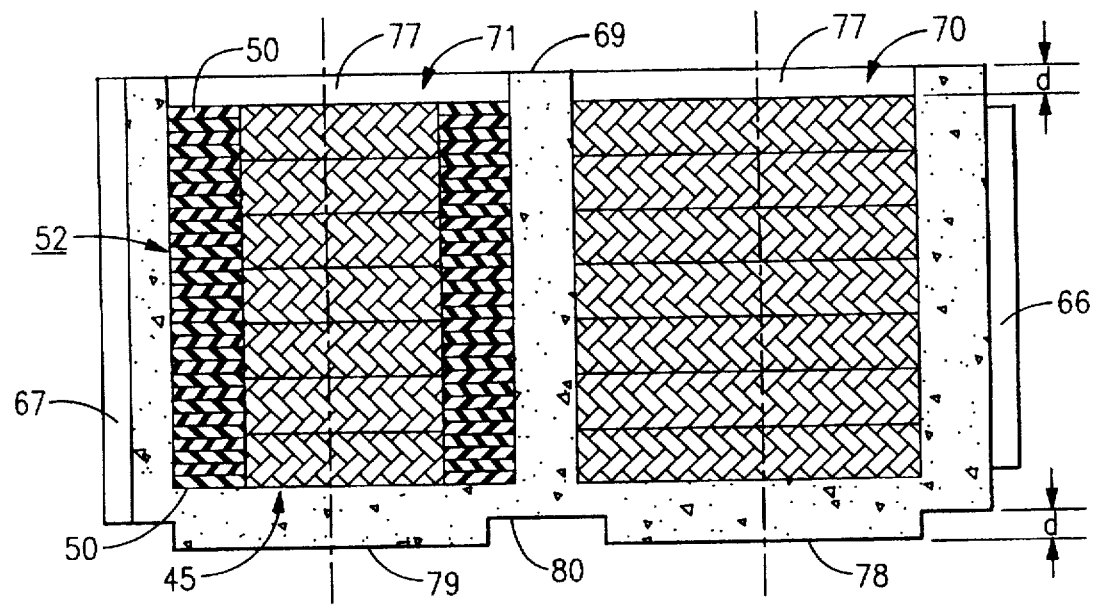
FIG. 12 is a side view in section showing the casing sections mounted in the blind openings formed in the block.
Figure 13:
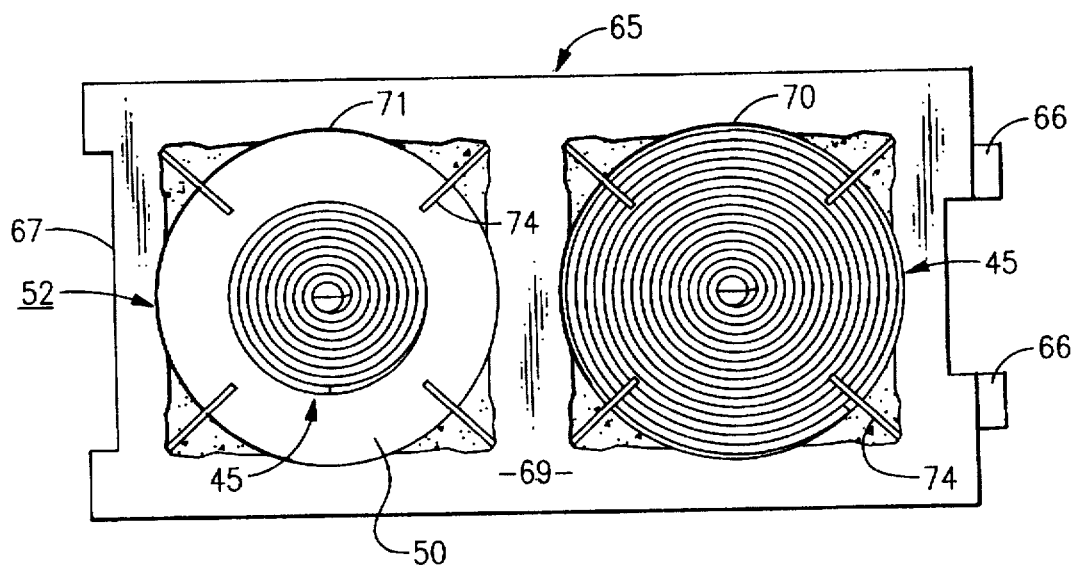
FIG. 13 is a top view of the concrete block shown in FIG. 10.

Two blind cylindrical holes 70 and 71 of equal diameter are precast into the blocks that extend downwardly through the top wall 69 of the block to a desired depth. As best illustrated in FIG. 12 a thread bundle 45 is shown placed in blind hole 70 and a tread and side wall assembly 52 is shown placed in the second blind hole 53. The bundles preferably fill the blind holes and are brought to a height above the floor of the hole so that the top of the bundle 45 or the stack assembly 52 is a predetermined distance (d) and from the top of the block thus providing a cavity 77 over the casings. The bundle 45 and the stack assembly 52 are contained in the holes by means of retaining pins 74—74 that are driven into precast receiving holes in the block.

A pair of circular pads 78 and 79 are cast in axial alignment with the blind holes 70 and 71 in the bottom wall. The pads protrude outwardly from the bottom wall 80 of the block a distance that is substantially equal to the depth of cavity 70. The diameter of each pad is slightly less than the diameter of each blind hole and are spaced so that the pads of one block can be received in cavities of adjacent blocks thus closing the blind holes and locking the blocks together when they are stacked one on top of the other. The center distance between the holes and the pads are further arranged so that the blocks can be stacked in a staggered configuration so as in interrupt the joints between the blocks when constructing a vertical wall. Although the blind holes and pads are shown as being circular in form, they can take any suitable shape provided the block interlocks in the manner described above.

The term concrete is used herein in a broad sense to define any type of material such as cement or concrete containing sand, gravel, fly ash or binding materials which is cast as a mortar and eventually hardens into a desired shape. It should be further evident to one skilled in the art that the present invention is not limited to the production of rectangular shaped concrete blocks and the tread sections 45 and side wall sections 50 can be encased or partially encased in any suitable structure without departing from the teachings of the present invention.

While this invention has been explained with reference to the structure disclosed herein, it is not confined to the details as set forth and this application is intended to cover any modifications and changes as may come within the scope of the following claims.

What is claimed is:

1. A method of usefully disposing of used automotive tire casing that includes the steps of:
    separating the tread section of a casing circumferentially from the two side wall sections,
    slitting the tread section laterally,
    abutting a plurality of tread sections in an end to end configuration to form an elongated band of tread sections,
    rolling the band of tread sections into a tight spiral bundle whereby the bundle can be incorporated into other structures.

2. The method of claim 1 that includes the further step of mounting the bundle in a block of concrete.

3. The method of claim 2 including completely encapsulating the bundle in the block of concrete.

4. The method of claim 2 including partially encapsulating the bundle in said block of concrete.

5. The method of claim 4 encapsulating the outer circular periphery of said bundle in said block of concrete.

6. The method of claim 4 encapsulating the outer circular periphery and one side face of said bundle in said block of concrete.

7. The method of claim 1 including inserting the bundle into a precast opening in a block of concrete.

8. The method of claim 7 that includes the further step of securing the bundle in said precast opening.

9. The method of claim 6 that includes the further step of stacking separated casing side wall sections in axial alignment one on top of the other and mounting at least one stack in a block of concrete.

10. The method of claim 9 that includes the further step of mounting at least one bundle of tread section in said block of concrete along with said at least one stack of side wall sections.

11. The method of claim 10 that includes the further step of mounting a bundle of tread sections inside said stack of side wall sections.

12. The method of claim 9 that includes the further step of cutting a wide lateral kerf in the two side wall sections of a casing, compressing one section circumferentially and placing the compressed section inside the other section to form a compact side wall pair.

13. The method of claim 12 that includes the further step of placing side wall pairs one on top of the other in axial alignment to form said stack.

14. A method of usefully disposing of used tire casings that includes the steps of:
    cutting each tire casing radially to form a wide kerf through both sidewall sections and the tread section,
    separating the tread section circumferentially from the sidewall sections,
    joining a plurality of tread sections end to end to form an extended band of tread sections,
    rolling the band into a tight bundle;
    placing the sidewall sections one on top of the other in axial alignment to form a stack of side wall sections, and
    mounting at least one tread bundle and at least one side wall stack within a block of curable material.

15. The method of claim 14 including the further step of placing a bundle of tread sections inside said at least one stack of side wall sections.

16. The method of claim 14 completely encapsulating said at least one stack and one bundle in said block.

17. The method of claim 14 including placing said tread bundle and said side wall stack in openings precast in a preformed block of concrete and further including the step of securing each bundle and stack in said openings.

18. The method of claim 14 including mounting a plurality of tread bundles and side wall stacks in precast openings in said preformed block.

19. A building member that includes:
    a concrete block having at least one planar wall,
    said block having at least one blind hole passing inwardly through said one planar wall thereof, and
    a tightly wound spiral bundle of tire casing tread sections contained inside said blind hole.

20. The building block of claim 19 that further includes means to secure said bundle in said opening.

21. The building block of claim 19 wherein said block has opposed front and back walls, end walls and top and bottom walls and further includes at least one outwardly protruding pad on the bottom wall of said block, said pad complimenting a blind hole opening in the top wall so that the pad is receivable within the blind hole opening of an adjacent block when the blocks are stacked one on top of the other.

22. The building block of claim 21 wherein said block has a plurality of blind holes precast therein and an equal number of pads that are axially aligned with said blind holes.

23. The building block of claim 22 wherein at least one blind hole contains side wall tire sections that have been separated from said tire casing tread sections, said side wall sections being stacked on upon another in axial alignment with said one blind hole.

24. The building block of claim 23 that further includes a tread bundle contained inside said side wall stack.

25. The building block of claim 18 that further includes interlocking means mounted upon the end walls of said block for removably connecting the block to a second block in end to end alignment.

26. A building member that includes a structure formed of a curable material and containing at least one bundle of tire casing tread sections that are abutted end to end and wound into a tight spiral.

27. The building member of claim 26 wherein said structure contains a plurality of spiral wound bundles.

28. The building member of claim 27 wherein said structure is a concrete panel.

29. The structure of claim 28 wherein the panel further contains at least one stack of tire sidewall sections that are placed in axial alignment.

30. The structure of claim 29 that further includes a tread section bundle contained within at least one stack.

31. The structure of claim 28 that further includes reinforcing bars mounted within the concrete panel.

32. The structure of claim 28 wherein the spiral wound bundle is completely encapsulated within said concrete.

33. The structure of claim 29 wherein said spiral wound bundle and said stack are encapsulated within said concrete.

34. The structure of claim 28 herein said panel has interlocking means mounted upon its peripheral walls so that panels can be removably locked together in assembly to form a wall.

* * * * *